United States Patent
Han

(10) Patent No.: US 7,293,111 B2
(45) Date of Patent: Nov. 6, 2007

(54) NETWORK INTERFACE SYSTEM SUPPORTING A PLURALITY OF PHYSICAL LAYERS AND THE METHOD THEREOF

(75) Inventor: Chia-Hui Han, Kaohsiung (TW)

(73) Assignee: VIA Technologies, Inc., Taipei Hsien (TW)

( * ) Notice: Subject to any disclaimer, the term of this patent is extended or adjusted under 35 U.S.C. 154(b) by 798 days.

(21) Appl. No.: 10/064,455

(22) Filed: Jul. 17, 2002

(65) Prior Publication Data
US 2003/0110301 A1    Jun. 12, 2003

(30) Foreign Application Priority Data
Dec. 12, 2001   (TW) ............................. 90130748 A

(51) Int. Cl.
- G06F 15/16   (2006.01)
- G06F 3/00    (2006.01)
- G06F 9/44    (2006.01)
- G06F 9/46    (2006.01)
- G06F 13/00   (2006.01)

(52) U.S. Cl. ......................... 709/250; 719/321
(58) Field of Classification Search ........ 709/249–250; 719/321, 327
See application file for complete search history.

(56) References Cited

U.S. PATENT DOCUMENTS 5,321,819 A * 6/1994 Szczepanek ................ 709/228
6,381,218 B1 * 4/2002 McIntyre et al. ........... 370/245

* cited by examiner

*Primary Examiner*—Glenton B. Burgess
*Assistant Examiner*—Sean Reilly
(74) *Attorney, Agent, or Firm*—Jianq Chyun IP Office

(57) ABSTRACT

The present invention provides a network system supporting a plurality of physical layers and the method thereof. The driver system and the method thereof utilizes the basic input/output system of the computer system to setup the network physical layer that is physically connected, and to calculate the simulation device code corresponding to the selected network physical layer according to the setup and the device code read from the network interface adapter, so that the computer system is able to recognize and enable the appropriate device driver of the physical layer. Therefore, the user is able to change the physical layer that is physically connected without reloading the device driver corresponding to the physical layer that is physically connected again and again, and also doesn't have to reconfigure the communication protocol parameters.

6 Claims, 2 Drawing Sheets

NETWORK INTERFACE SYSTEM SUPPORTING A PLURALITY OF PHYSICAL LAYERS AND THE METHOD THEREOF

CROSS REFERENCE RELATED APPLICATIONS

This application claims the priority benefit of Taiwan application serial no. 90130748, filed on Dec. 12, 2001.

BACKGROUND OF INVENTION

1. Field of Invention

The present invention generally relates to a network interface system, and more particularly, to a network interface card driving system and method supporting a plurality of physical layers.

2. Description of Related Art

In order to achieve the above and other objectives, the present invention provides a network interface system suitable for a computer network supporting a plurality of physical layers. The driver system comprises the network interface adapter and the computer system supporting a plurality of physical layers. The network interface adapter supporting a plurality of physical layers has a plurality of network physical layers for connecting to the network through different network physical layers. Moreover, the network interface adapter supporting a plurality of physical layers only provides a device code, but does not provide different codes corresponding to different network physical layers. The computer system is used for inserting the network interface adapter supporting a plurality of physical layers. Furthermore, the network interface adapter supporting a plurality of physical layers is driven according to the network physical layer selected by the user. After the user installs the device drivers supporting these network physical layers, if the user wants to change the network physical layer selected, the user only needs to select the physical layer on the screen provided by the basic input/output system of the computer system. At that moment, the basic input/output system reads the device code provided by the network interface adapter supporting a plurality of physical layers, and according to the network physical layer selected and the device code read, calculates the simulation device code corresponding to the network physical layer, so as to setup the device driver.

In view of this, the present invention provides a network interface system supporting a plurality of physical layers and the method thereof. When the user changes the connected network physical layer, the driver system and the method thereof is able to support the selected network physical layer without re-installing the device driver and without reconfiguring the communication protocol parameters.

SUMMARY OF INVENTION

In order to achieve the above and other objectives, the present invention provides a network interface system suitable for a computer network supporting a plurality of physical layers. The driver system comprises the network interface adapter and the computer system supporting a plurality of physical layers. The network interface adapter supporting a plurality of physical layers has a plurality of network physical layers for connecting to the network through different network physical layers. Moreover, the network interface adapter supporting a plurality of physical layers only provides a device code, but not provide different codes corresponding to different network physical layers. The computer system is used for inserting the network interface adapter supporting a plurality of physical layers. Furthermore, the network interface adapter supporting a plurality of physical layers is driven according to the network physical layer selected by the user. After the user installs the device drivers supporting these network physical layers, if the user wants to change the network physical layer selected, the user only needs to select the physical layer on the screen provided by the basic input/output system of the computer system. At that moment, the basic input/output system reads the device code provided by the network interface adapter supporting a plurality of physical layers, and according to the network physical layer selected and the device code read, calculates the simulation device code corresponding to the network physical layer, so as to setup the device driver.

In a preferred embodiment of the present invention, the network interface adapter supporting a plurality of physical layers comprises a physical layer chip (PHY), a device code storage device, a magnetic inductor, a first type connector and a second type connector. The physical layer chip supports a plurality of physical layers. The device code storage device stores a device code of the network interface adapter supporting a plurality of physical layers. The magnetic inductor couples the physical layer chip and works as the interface between the physical layer chip and the computer network. The first type connector is used for coupling the magnetic inductor with the computer network through one of these network physical layers. The second type connector is used for coupling the magnetic inductor with the computer network through one of these network physical layers. The computer system comprises a basic input/output system, a chipset and a central processing unit (CPU). The basic input/output system provides a selection screen of the network physical layers and reads the device code, and calculates a simulation device code corresponding to the selected network physical layer according to the selected network physical layer and the device code. The chipset is coupled to the basic input/output system. It is preferred that the chipset embedded with a media access controller, and provides an interface to the network interface adapter supporting a plurality of physical layers. The central processing unit is coupled to the chipset to execute the operating system and the basic input/output system of the computer system, and to enable the device driver of the computer system according to the simulation device code.

In the preferred embodiment of the present invention, the physical layer chip supports at least two of the network physical layers of the Ethernet, HomeNet, Wireless LAN, or Home Plug. The computer system at least has installed any two of the network physical layer device drivers supporting the Ethernet, HomeNet, Wireless LAN, or Home Plug.

In the preferred embodiment of the present invention, interface of the computer system and the network interface adapter supporting a plurality of physical layers complies with the Advanced Communication Riser interface standard defined by US AMD corporation. The central processing unit is made by AMD Corporation, US. The operating system is the Windows operating system of Microsoft Corporation, US. The device code comprises SubSystem ID and SubVendor ID.

In the preferred embodiment of the present invention, the basic input/output system provides a manual option and an automatic option. When the automatic mode is selected by a user, the computer system automatically detects the wired network physical layer that is physically connected, and calculates the simulation device code to recognize the physically connected physical layer according to the detected result.

The present invention further provides a method supporting a plurality of physical layers. The method is suitable for a computer system that has a network interface adapter supporting a plurality of physical layers. The network interface adapter supporting a plurality of physical layers only provides a device code, but not provide different codes corresponding to different network physical layers. The computer system has a basic input/output system, and has installed a plurality of device drivers supporting those network physical layers. The method comprises the steps of: at first, providing a basic input/output system selection setup screen to select the network physical layer physically used; then, reading the device code provided by the network interface adapter supporting a plurality of physical layers; afterwards, according to the selected network physical layer and the device code, calculating the simulation device code corresponding to the selected network physical layer to setup one of the device drivers.

As described above, a network interface system supporting a plurality of physical layers and the method thereof according to the present invention is able to load the device drivers supporting various physical layers into the computer system in advance, and is able to use the basic input/output system screen of the computer system to select the type of the network physical layer physically used. At that moment, the basic input/output system reads a device code provided by the network interface adapter, and calculates the simulation device code corresponding to the network physical layer according to the type of the network physical layer physically used, so that the computer is able to enable the appropriate device driver to drive the network interface adapter. Therefore, the user is able to change the various network physical layers without reloading the device driver supporting the network physical layer that is selected; neither does the user have to reconfigure the communication protocol parameters. After this complicated job is omitted, the user is able to implement the change of the network physical layer easily. Thus, the objective of supporting a plurality of network physical layers is achieved.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings, FIG. 1 schematically shows a block diagram of a network interface system supporting a plurality of physical layers of the preferred embodiment according to the present invention.

DETAILED DESCRIPTION

Figure 1:
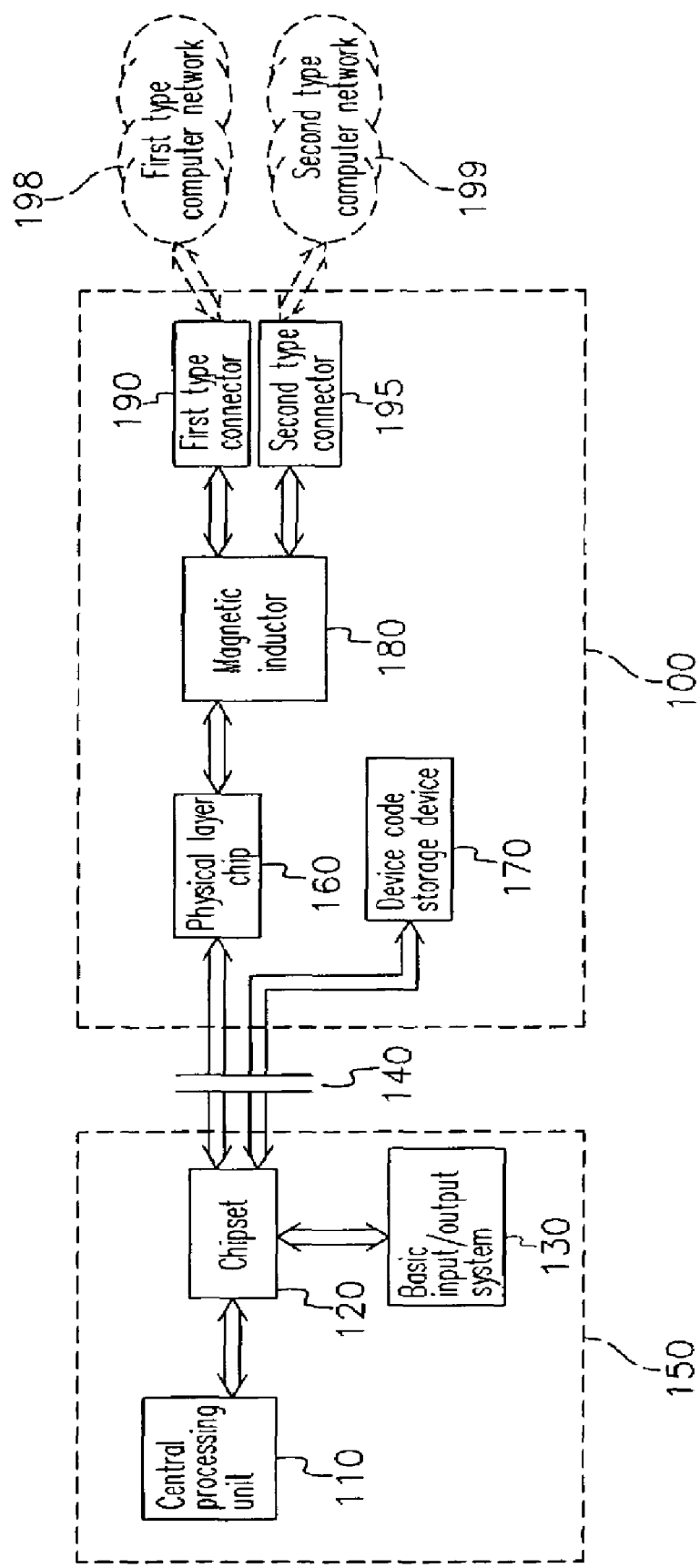

FIG. 1 schematically shows a block diagram of a network interface system supporting a plurality of physical layers of a preferred embodiment according to the present invention. As shown in FIG. 1, the network interface system supporting a plurality of physical layers connects to a first type computer network 198 and a second type computer network 199. These two types of computer network can be any two of the physical layer networks of the Ethernet, HomeNet, Wireless LAN and Home Plug. In the preferred embodiment, these two types of the computer network are Ethernet and HomeNet. The network interface system supporting a plurality of physical layers comprises a network interface adapter 100 that supports a plurality of physical layers and a computer system 150. The network interface adapter 100 that supports a plurality of physical layers has a plurality of network physical layers to connect to the computer networks having various network physical layers, such as the physical layers of Ethernet and HomeNet. Moreover, the network interface adapter 100 supporting a plurality of physical layers only provides a device code, but does not provide different codes corresponding to different network physical layers. The computer system 150 is used for inserting the network interface adapter 100 supporting a plurality of physical layers. Furthermore, the network interface adapter 100 supporting a plurality of physical layers is driven according to the network physical layer selected by the user. After the user installs the device drivers supporting those network physical layers, if the user wants to change the network physical layer selected, the user only needs to select the physical layer on the screen provided by the basic input/output system 130 of the computer system 150. At that moment, the basic input/output system 130 reads the device code provided by the network interface adapter 100 supporting a plurality of physical layers, and according to the network physical layer selected and the device code read, calculates the simulation device code corresponding to the network physical layer, so as to setup the device driver.

The network interface adapter 100 supporting a plurality of physical layers comprises a physical layer chip 160, a device code storage device 170, a magnetic inductor 180, a first type connector 190 and a second type connector 195. For example, the physical layer chip is the AMD79C901 chip manufactured by US AMD Corporation. The physical layer chip supports the physical layers of Ethernet and HomeNet, and receives the digital data of the network media access control layer. Then, the physical layer chip converts the digital data into the analog data and transmits the analog data through the magnetic inductor 180. The magnetic inductor 180 is used for the impedance match. The network such as the Ethernet is connected by using the Ethernet cable having the RJ45 connector that is alternatively named as the first type connector 190, the network such as the HomeNet is connected by using the telephone cable having the RJ11 connector that is alternatively named as the second type connector 195. Preferably, the device code storage device 170 is an Electrically Erasable Programmable Read Only Memory (EEPROM), which is used to store a device code of the network interface adapter 100 supporting a plurality of physical layers. The device code comprises the configuration values of SubSystem ID and SubVendor ID of the peripheral component interconnection (PCI). Since the interface adapter only has a device code, it is not able to provide the upper layer program to distinguish the physical layer that is physically connected. The computer system 150 shown in the diagram comprises a basic input/output system 130, a chipset 120 and a central processing unit (CPU) 110. The basic input/output system provides the selection screen of the network physical layers and reads the device code, and calculates a simulation device code corresponding to the selected network physical layer according to the selected network physical layer and the device code. For example, when Ethernet is selected, the simulation SubVendor ID=SubVendor ID, whereas, when HomeNet is selected, the simulation SubVendor ID=SubVendor ID+1. The value of the calculated result is subsequently stored in the PCI configuration register to enable the device driver. The chipset 120 coupled to the basic input/output system 130 integrates a network media access controller, and provides an interface for coupling the network interface adapter 100 supporting a plurality of physical layers. The interface herein complies with the standard interface of the advanced communication riser (ACR) interface 140 defined by US AMD Corporation. The central processing unit 110 that is tightly coupled to the chipset 120, executes the operating system program of the computer system, the basic input/output system program, and enables the device driver of the computer system according to the simulation device code. The central processing unit 110 is the central processing unit manufactured by US AMD Corporation. The operating system is the Windows operating system manufactured by US Microsoft Corporation. The device driver is either an independent device driver or an combined device driver that supports the Ethernet physical layer and the HomeNet physical layer of the AMD79C901. The computer system program enables the function of the network physical layer that is physically connected according to the calculated simulation device code.

In this preferred embodiment, the basic input/output system 130 provides both manual and automatic options. When the automatic mode is selected by the user, the computer system detects the network physical layer that is physically connected automatically, and calculates the device code for the computer system to recognize the connected physical layer according to the detected result.

Figure 2:
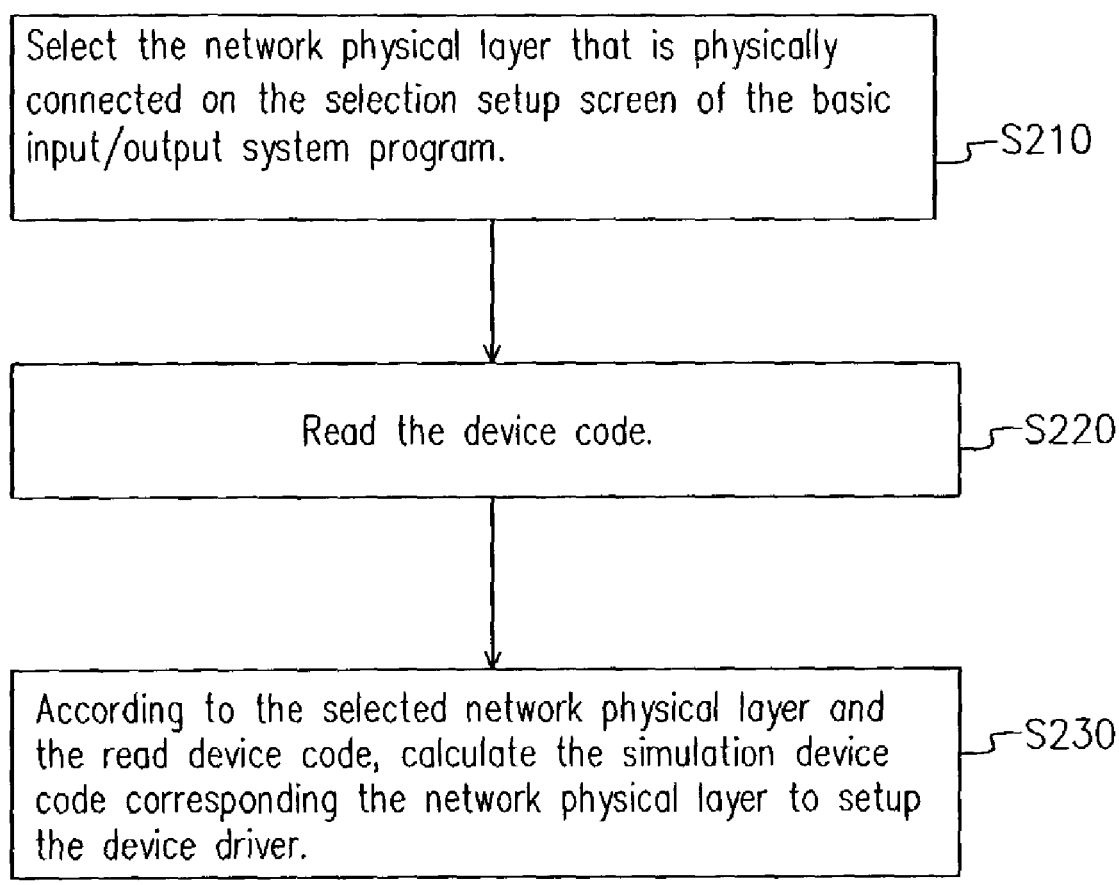
FIG. 2 schematically shows a flow chart of a method supporting a plurality of physical layers of the preferred embodiment according to the present invention.

In the description above, a method supporting a network interface adapter with a plurality of physical layers can be inducted, as shown in FIG. 2, for a computer system 150 inserted with a network interface adapter 100 supporting a plurality of physical layers. The network interface adapter 100 supporting a plurality of physical layers, only provides a device code, but does not provide a plurality of codes corresponding to the different network physical layers. The computer system 150 contains a basic input/output system 130, and is installed with the device drivers installed supporting those network physical layers. At step S210, provide a selection setup screen of the basic input/output system for selecting the network physical layer that is physically used. Then, at step S220, read the device code provided by the network interface adapter supporting a plurality of physical layers. At step S230, according to the selected network physical layer and the read device code, calculate the simulation device code corresponding to the network physical layer, so as to setup the device driver S230.

Therefore, by applying a network interface system supporting a plurality of physical layers and the method thereof, the device drivers supporting the various physical layers are loaded into the computer system in advance. The type of the network physical layer that is physically used can be selected from the screen of the basic input/output system of the computer system. When the automatic mode is selected, the wired network physical layer that is physically connected can be detected automatically, for example, to detect whether the transmission line of Ethernet, HomeNet or Home Plug exists, and whether the connection signal expected exists on the transmission line, so as to determine whether it is the wired network physical layer that is physically used. At that moment, the basic input/output program reads a device code provided by the network interface adapter, and calculates the simulation device code corresponding to the network physical layer according to the type of the network physical layer that is physically used, so that the computer system is able to enable the appropriate device driver to drive the network interface adapter. Therefore, the user is able to change the variant network physical layers without removing the old device driver and reloading the new device driver supporting the network physical layer that is selected, neither does the user have to reconfigure the communication protocol parameters such as the IP address and the domain name. After this complicated job is omitted, the user is able to implement the change of the network physical layer easily. Thus, the objective of supporting a plurality of network physical layers is achieved.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

The invention claimed is:

1. A network interface system, capable of supporting a plurality of physical layers, comprising:

a network interface adapter supporting the plurality of physical layers, for connecting to a computer network, and further comprising:

a physical layer chip, capable of supporting the plurality of physical layers;

a device code storage device, for storing a device code of the network interface adapter supporting the plurality of physical layers;

a magnetic inductor, for coupling the physical layer chip, and interfacing between the physical layer chip and the computer network;

a first type connector, coupling the magnetic inductor with the computer network through one of the network physical layers; and a second type connector, for coupling the magnetic inductor with the computer network through one of die network physical layers; and a computer system, for inserting the network interface adapter supporting the plurality of physical layers, and further comprising:

a basic input/output, for providing a selection screen of the network physical layers and reading the device code, so as to calculate a simulation device code corresponding to a selected network physical layer according to the selected network physical layer and the device code;

a chipset, coupled to the basic input/output system, and embedded a network media access controller to provide an interface for the network interface adapter supporting the plurality of physical layers; and a central processing unit (CPU), coupled to the chipset to execute an operating system of the computer system, the basic input/output system, and set up a device driver of the computer system according to the simulation device code.

2. The network interface system of claim 1, wherein the basic input/output system program provides a manual option and an automatic option, wherein when the automatic mode is selected by the user, the computer system automatically detects the network physical layer that is physically connected, and calculates the simulation device code for the computer system to recognize the connected network physical layer according to the detected result.

3. A network interface system supporting a plurality of physical layers, suitable for a computer network, comprising:
- a network interface adapter, for coupling the computer network, wherein the network interface adapter has a plurality of network physical layers and a device code, and is able to connect the computer network through one of the network physical layers; and
- a computer system, wherein, the computer system is used to insert the network interface adapter, and drives the network Interface adapter supporting the plurality of physical layers according to one of the network physical layers selected by a user, wherein, after the user installs a plurality of device drivers supporting the network physical layers, if the selected network physical layer is to be changed, another physical layer is selected from a screen provided by the basic input/output system of the computer system; and then, the basic input/output system reads the device code provided by the network interface adapter to calculate a simulation device code corresponding to the selected network physical layer according to the network physical layer selected and the device code read, so that the device driver is enabled.

4. A method for supporting a plurality of physical layers, suitable for a computer system with a network interface adapter supporting the plurality of physical layers, wherein, the network interface adapter comprises a plurality of network physical layers and a device code, the computer system has a basic input/output system, and has installed a plurality of device drivers supporting the network physical layers, wherein the method comprises the steps of:
- providing a selection setup screen of the basic input/output system to select one of the network physical layers, which is physically used;
- reading the device code provided by the network interface adapter supporting the plurality of physical layers; and
- according to the selected network physical layer and the read device code, calculating a simulation device code corresponding to the selected network physical layer to enable one of the device drivers.

5. The method of claim 4, wherein the basic input/output system program provides a manual option and an automatic option, wherein when the automatic mode is selected by the user, the computer system automatically detects the network physical layer that is physically connected, and calculates the simulation device code for the computer system to recognize the physically connected physical layer according to the detected result.

6. The network interface system of claim 1, wherein the device code comprises a SubSystem ID and a SubVendor ID of the PCI configuration.

* * * * *